United States Patent Office 3,486,905
Patented Dec. 30, 1969

3,486,905
STABILIZED CHOCOLATE BEVERAGES
Eric B. Hotelling, Kinnelon, N.J., assignor to Yoo-Hoo Chocolate Beverage Corp., Carlstadt, N.J., a corporation of Delaware
No Drawing. Filed Feb. 16, 1967, Ser. No. 616,497
Int. Cl. A23g 1/00
U.S. Cl. 99—25                                    12 Claims

ABSTRACT OF THE DISCLOSURE

A chocolate flavored beverage having a cocoa base of varying cocoa butter content, which is substantially free of segregated and fragmented precipitates of cocoa butter normally accruing on standing or storage; and a method of making such beverage.

BACKGROUND OF THE INVENTION

While chocolate flavored beverages have been known for some time, they present a problem which has limited the extent of use of such beverages. Thus, the cocoa base used in making the beverage tends to form a precipitate of cocoa butter when the beverage has been standing or stored at the usual reduced temperature to preserve the same. Such precipitates take the form of white rings, which are unsightly. Moreover, if the container is shaken or otherwise agitated, the ring precipitate tends to break up into fragments, thus making the appearance of the beverage even more unsightly and unappetizing.

The precipitation phenomenon is aggravated as the fat content of the cocoa base increases. This in turn tends to encourage the use of cocoa bases having a relatively low fat content to minimize the formation of objectionable precipitate. However, with a decrease in fat content of the cocoa base, there is a corresponding deterioration in flavor, accompanied by an undesirable sensation in the mouth.

It has been suggested that the objectionable precipitate in cocoa base beverages may be suppressed somewhat by adding to the beverage substantial quantities of a stabilizing agent, more particularly the sea weed derivative, carrageenan; which stabilizer is used in proportions as high as 200 parts per million of the beverage.

While the use of carrageenan does limit fragmentation of the ring precipitate, it does not eliminate the ring itself, even with cocoas having a very low fat content, of the order of less than 1%. With high fat content cocoa, say 10–12% or more, the known stabilizer is ineffective to inhibit the formation of heavy ring precipitates, which in turn give rise to highly objectionable fragments when the beverage is subject to agitation of any kind.

Accordingly, an object of this invention is to provide an improved, stabilized chocolate flavored beverage having incorporated therein relatively small amounts of a stabilizing agent, more particularly dioctyl sodium sulfosuccinate, as in the form of di-(2-ethyl hexyl) sodium sulfosuccinate, which is highly effective in markedly reducing the formation of ring precipitates of cocoa butter, and eliminating or minimizing fragmentation of the precipitate on agitation of the beverage.

A further object of this invention is to provide a chocolate flavored beverage using a cocoa base of relatively high fat content to maximize the flavor of the beverage, which has been stabilized to minimize the formation of objectionable ring precipitates and to substantially eliminate the unsightly and unappetizing fragmentation of such precipitates when the beverage is agitated after standing.

Another object of this invention is to provide an improved method of stabilizing chocolate flavored beverages having a cocoa base of widely varying fat content, wherein the stabilizing agent is added directly to the formulated beverage and is effective to minimize the precipitation of cocoa butter in the beverage upon standing or storage, and eliminating or markedly reducing objectionable fragmentation of such precipitate when the beverage is subject to agitation of any kind.

Other objects of this invention will in part be obvious and in part hereinafter pointed out.

SUMMARY OF THE INVENTION

The invention essentially relates to the use of dioctyl sodium sulfosuccinate (DSS) as a stabilizing agent for chocolate flavored beverages having a cocoa base with a fat content ranging from about 0.5% to about 22.0% by weight, the stabilizing agent, alone or in conjunction with other stabilizing agents being added directly to the formulated beverage; to thereby improve the appearance of such beverage after standing or storage in the usual manner, by reducing or eliminating unsightly precipitation and fragmentation of the cocoa butter content thereof.

DESCRIPTION OF THE PREFERRED EMBODIMENT

A chocolate beverage of conventional formulation was prepared in the usual manner, well known in the art; the same containing the following ingredients in the indicated proportions:

Non-fat dry milk solids _____ lbs__ 60
Granulated sugar _____ lbs__ 60
Cocoa _____ lbs__ 5
Sodium chloride _____ oz__ 6
Flavor (vanillin) _____ oz__ 1
Sodium bicarbonate _____ oz__ 4
Water to make a final volume of 100 gallons.

The solid ingredients were stirred slowly into 50 gallons of water at a temperature of 90° F. and then enough warm water was added to bring the final volume to 100 gallons. The cocoa used in the foregoing formulation had a fat content of 12% by weight.

Separate sample portions were drawn from the beverage prepared in accordance with the formulation noted above. The respective sample portions had directly added thereto varying amounts of stabilizing agents, particularly carageenan (CAR) and dioctyl sodium sulfosuccinate (DSS) more particularly di-(2-ethyl hexyl) sodium sulfosuccinate, to provide test batches which were bottled and sterilized in a conventional manner.

The resultant bottled test batches were stored in a warehouse at an average temperature of about 50° F. for a period of 4 weeks. At the end of that period, the respective samples were observed and rated for the intensity of precipitated ring formation and the number and character of fragments formed upon gently shaking the bottles containing the samples. The results of such tests were tabulated as follows:

| Sample | Stabilizer | Showing |
|---|---|---|
| #1 | None | Very heavy ring, many fragments. |
| #2 | CAR, 200; DSS, 0 | Heavy ring, fragments. |
| #3 | CAR, 0; DSS, 25 | Moderate ring, few fragments. |
| #4 | CAR, 200; DSS, 25 | Moderate ring, no fragments. |
| #5 | CAR, 0; DSS, 50 | Moderate ring, few fragments. |
| #6 | CAR, 0; DSS, 100 | Moderate ring, no fragments. |
| #7 | CAR, 200; DSS, 100 | Slight ring, no fragments. |

In the foregoing, CAR represents carrageenan; DSS represents dioctyl sodium sulfosuccinate, more particularly di-(2-ethyl hexyl) sodium sulfosuccinate; the numeral following CAR and DSS represents the number of parts of stabilizer per million added to the beverage samples.

Another set of sample portions of beverage was prepared as in the formulation noted above, except that the cocoa used had a fat content of 1%. Samples #1 to #7 were prepared with addition of stabilizers as in the case of samples #1 to #7 above. After storing and shaking, as set forth above; sample #1 showed a heavy ring and many fragments; sample #2 showed a very slight ring and no fragments; samples #3, #4, #5, #6 and #7 also showed a very slight ring and no fragments.

Still another set of sample portions of beverages was prepared as in the formulation noted above, except that the cocoa used had a fat content of 22%. Stabilizing agent was again added directly to each of samples #1 to #7, in the proportions indicated in the tabulation noted above. After storage and shaking, as previously described, sample #1 showed a very heavy ring and many fragments; sample #2 also showed a very heavy ring and many fragments; samples #3, #4 and #5 showed a heavy ring and few fragments; sample #6 showed a moderate ring and few fragments, while sample #7 showed a moderate ring and no fragments.

A master batch of carbonated chocolate beverage was prepared in accordance with the following formulation:

| | | |
|---|---|---|
| Granulated sugar | lbs | 100 |
| Cocoa | lbs | 5 |
| Benzoic acid | oz | 12 |
| Flavor (vanillin) | oz | 1 |

Carbonated water to make 100 gallons.

The solid ingredients and flavor were blended and stirred into the carbonated water under pressure. The cocoa used had a fat content of 12% by weight. Other master batches were similarly prepared, using cocoa with a fat content of 1% and 22% respectively. Test samples were withdrawn from each of the batches and stabilizers were directly added to in the proportions indicated above, and in a range of from 10 to 100 parts of dioctyl sodium sulfosuccinate to 1 million parts of beverage alone, or in combination with 100 to 500 parts of carrageenan to 1 million parts of beverage.

The foregoing test samples were bottled, sterilized and stored for 4 weeks at a temperature of 50° F. On evaluating the samples for ring formation and fragmentation, the results were quite similar to those obtained with the first mentioned formulation. Thus, it was found that with as little as 10 parts of dioctyl sodium sulfosuccinate (DSS) per million parts of beverage there was a marked reduction in ring and fragment formation, as compared to beverage samples having no stabilizer content or carrageenan as the sole stabilizer. The improvement in stabilizing effect of DSS was particularly noticeable when the beverage contained cocoa of higher butter fat content, up to 25%.

Thus, it was determined that dioctyl sodium sulfosuccinate in amounts ranging from 10 to 100 parts, and preferably from 25 to 50 parts per million parts of a cocoa base beverage achieved substantial decreases in the objectionable precipitation phenomenon peculiar to such beverages. Further, that the dioctyl sodium sulfosuccinate can be used in admixture with carrageenan to form a composite stabilizer which may be added directly to the beverage to achieve a beverage of excellent chocolate flavor yet substantially devoid of objectionable ring and fragment formation.

While the stabilizer DSS set forth herein is the Di-(2-ethyl hexyl) ester of sodium sulfosuccinate; it is understood that the Di-(n-octyl), Di-(isooctyl) and other dialkyl esters of sodium sulfosuccinate, having 8 carbon atoms in any arrangement in the alkyl chain, may be used as described above.

As various changes might be made in the embodiments of the herein disclosed invention without departing from the spirit thereof, it is understood that all matter herein set forth shall be deemed illustrative and not by way of limitation except as set forth in the appended claims.

I claim:

1. A chocolate flavored beverage comprising a liquid beverage vehicle, a cocoa base having a fat content of from about 0.5% to about 25.0%; and a stabilizer for said beverage effective to markedly reduce precipitation and fragmentation of the fat content of said cocoa base upon storage and agitation of said beverage, said stabilizer comprising from 10 to 100 parts of dioctyl sodium sulfosuccinate per million parts of the beverage.

2. A beverage as in claim 1 wherein said stabilizer comprises from about 25 parts to about 50 parts of di-(2-ethyl hexyl) sodium sulfosuccinate per million parts of the beverage.

3. A beverage as in claim 1 wherein said stabilizer further includes from 100 to about 500 parts of carrageenan per million parts of the beverage.

4. A beverage as in claim 3 wherein the carrageenan is present in the proportion of from 100 to about 200 parts per million parts of the beverage.

5. A beverage as in claim 1 wherein the beverage vehicle comprises an aqueous suspension of milk solids.

6. A beverage as in claim 1 wherein the beverage vehicle comprises carbonated water.

7. A beverage as in claim 3 wherein said stabilizer comprises about 25 parts of dioctyl sodium sulfosuccinate and about 200 parts of carrageenan per million parts of the beverage.

8. A beverage as in claim 3 wherein the cocoa base has a fat content of about 12%, and said stabilizer comprises about 25 parts of dioctyl sodium sulfosuccinate and about 200 parts of carrageenan per million parts of the beverage.

9. A method of stabilizing a chocolate flavored beverage comprising a liquid beverage vehicle and a cocoa base having a fat content of from about 0.5% to about 25.0% admixed with said vehicle; comprising adding to said mixture a stabilizer comprising from about 10 parts to about 100 parts of dioctyl sodium sulfo succinate to a million parts of said mixture, whereby to markedly reduce precipitation and fragmentation of the fat content of said cocoa base upon storage and agitation of the beverage.

10. A method as in claim 9 wherein said stabilizer further includes from 100 to about 500 parts of carrageenan per million parts of said mixture.

11. A method as in claim 9 wherein the beverage vehicle comprises an aqueous suspension of milk solids.

12. A method as in claim 9 wherein the beverage vehicle comprises carbonated water.

References Cited

UNITED STATES PATENTS

| | | | |
|---|---|---|---|
| 1,630,661 | 5/1927 | Jarson | 99—25 |
| 2,859,115 | 11/1958 | Rivoche | 99—25 X |
| 3,013,881 | 12/1961 | Carlson et al. | 99—24 |
| 3,181,953 | 5/1965 | Van Ness et al. | 99—78 |
| 3,403,028 | 9/1968 | Stancioff et al. | 99—26 |

A. LOUIS MONACELL, Primary Examiner

D. M. NAFF, Assistant Examiner

U.S. Cl. X.R.

99—23

Notice of Adverse Decisions in Interferences

In Interference No. 97,986 involving Patent No. 3,486,905, E. B. Hotelling, STABILIZED CHOCOLATE BEVERAGES, final judgment adverse to the patentee was rendered Jan. 2, 1973, as to claims 1, 2 and 5.

[*Official Gazette May 22, 1973.*]